United States Patent [19]
Philpot et al.

[11] Patent Number: 5,468,329
[45] Date of Patent: Nov. 21, 1995

[54] UNIVERSAL PIN STRIP AND RING FOR FILAMENT WINDING

[75] Inventors: Randall J. Philpot; Douglas G. Olsen; Sandra C. Ventrello; Eric R. Welsh; Daniel K. Buckmiller, all of Salt Lake City, Utah

[73] Assignee: Advanced Composites, Inc., Salt Lake City, Utah

[21] Appl. No.: 204,076

[22] Filed: Mar. 1, 1994

[51] Int. Cl.⁶ ........................................... B65H 81/00
[52] U.S. Cl. ........................ 156/429; 156/425; 156/173; 156/175; 156/169
[58] Field of Search ........................... 156/172, 173, 156/175, 169, 425, 429; 242/7.20, 7.21, 1

[56] References Cited

U.S. PATENT DOCUMENTS

| | | | |
|---|---|---|---|
| 3,356,120 | 12/1967 | Nohmura | 156/425 X |
| 4,089,727 | 5/1978 | McLain. | |
| 4,251,036 | 2/1981 | McLain. | |
| 4,288,267 | 9/1981 | McLarty | 156/425 X |
| 4,529,139 | 7/1985 | Smith et al. | 156/425 X |
| 4,762,583 | 8/1988 | Kaempen | 156/173 |
| 4,869,761 | 9/1989 | Weingart. | |
| 4,917,756 | 4/1990 | Cahuzac. | |
| 5,008,061 | 4/1991 | Block. | |
| 5,213,275 | 5/1993 | Giesy | 242/7.21 X |
| 5,213,646 | 5/1993 | Zsolnay. | |
| 5,261,616 | 11/1993 | Crane et al. | 156/466 X |
| 5,266,139 | 11/1993 | Yokota et al. | |

FOREIGN PATENT DOCUMENTS

| | | | |
|---|---|---|---|
| 2744586 | 4/1979 | Germany | 156/172 |
| 4739224 | 10/1972 | Japan | 156/172 |
| 5229018 | 9/1993 | Japan | 156/175 |

Primary Examiner—Jeff H. Aftergut
Attorney, Agent, or Firm—Daniel P. McCarthy

[57] ABSTRACT

A universal pin ring for use in securing filament in a stationary position with respect to a mandrel during a filament winding process is disclosed. In the preferred embodiment, the universal pin ring has two rows of pins along its length. The pins of the first row are adapted to serve as anchor pins to secure filament in a stationary position with respect to a mandrel. The pins of the second row are adapted to serve as guide pins to cause filament to quickly conform to the contour of a mandrel after turning of the filament during filament winding, thereby minimizing the size of the turnaround area. In some applications, both rows of pins would serve to anchor filament. In other applications the guide pins serve both to guide filament and to anchor filament that has slipped from an anchor pin. Reinforcing ribs and flex grooves on the universal pin ring are also disclosed.

18 Claims, 2 Drawing Sheets

UNIVERSAL PIN STRIP AND RING FOR FILAMENT WINDING

BACKGROUND OF INVENTION

A. Field of Invention

The invention is directed to the field of articles used to secure filament with respect to a mandrel during a filament winding process. More specifically, this invention is a universal pin ring mountable at both ends of a mandrel in the fiber turnaround region, the pin ring being useful to prevent fibers from slipping and thus having an incorrect orientation in the turnaround region. The invented universal pin ring is of such a configuration that it can be used in winding components in the range of sizes from very small to very large. The terms 'pin ring' and 'pin strip' are used interchangeably herein. The figures depict both a pin strip by itself and a pin ring installed in the preferred position on a mandrel.

B. The Background Art

In the prior art, only one manufactured pin ring was available. It was a molded tube about 2.5 inches in diameter that included a single row of triangular-shaped fin-like protrusions from its exterior diameter. These protrusions were used to anchor filament during the winding process. This pin ring was developed for winding down hole tubing used in the oil drilling industry. When other parts were to be wound, the manufacturer would typically have to make a pin ring by hand that was tailored to the specific application, since no universal pin ring was available.

SUMMARY OF INVENTION

An object of the invention is to provide a universal pin ring that is useful for manufacturing a wide variety of components or products. This is achieved by the configuration of the pin ring that permits it to be shortened for use on small diameter mandrels, and that permits multiple universal pin rings to be mounted end-to-end on a large diameter mandrel, thereby facilitating use of the universal pin ring on mandrels from very small to very large sizes.

An object of the invention is to facilitate rapid set-up of a filament winding machine. This is achieved by the readily sizable universal pin ring that can be quickly shortened or lengthened, in contrast to the time-consuming prior art process of constructing custom hand-made pin rings for each application.

An object of the invention is to provide longitudinal support to a component being manufactured by filament winding. This is achieved by the invented pin ring that firmly secures filament under tension as the filament is turned at the end of the part.

An object of the invention is to provide a universal pin ring that accomodates winding patterns consisting of low angle helical windings (i.e. angles approaching zero degrees) without fiber slippage. This is achieved by the preferred embodiment that uses two parallel rows of pins, one row being anchor pins and the other row being guide pins, to cause the fibers to precisely turn and yet hold the fibers firmly in place throughout the winding process.

An object of the invention is to minimize waste of fiber and resin in the filament winding process. The preferred embodiment that includes two parallel rows of pins causes filament to quickly conform to the mandrel contour after turnaround. This minimizes the length of the turnaround region at each end of the manufactured part. Because the turnaround region is typically trimmed from the manufactured part and discarded, the invented universal pin ring minimizes waste of material.

An object of the invention is to provide a pin ring that, in addition to being useful for manufacturing thick-walled tubing, is especially useful and advantageous for manufacturing thin-walled tubing. Thin-walled tubing often is manufactured by winding only a single layer of fiber and resin. If the fiber slips or lays incorrectly even once, then the tubing is defective and must be discarded. The invented universal pin ring facilitates accurate fiber placement, prevents fiber slippage and causes fiber to conform to the mandrel to avoid the manufacture of defective components.

DESCRIPTION OF THE PREFERRED EMBODIMENTS

A. Structure

Figure 1:
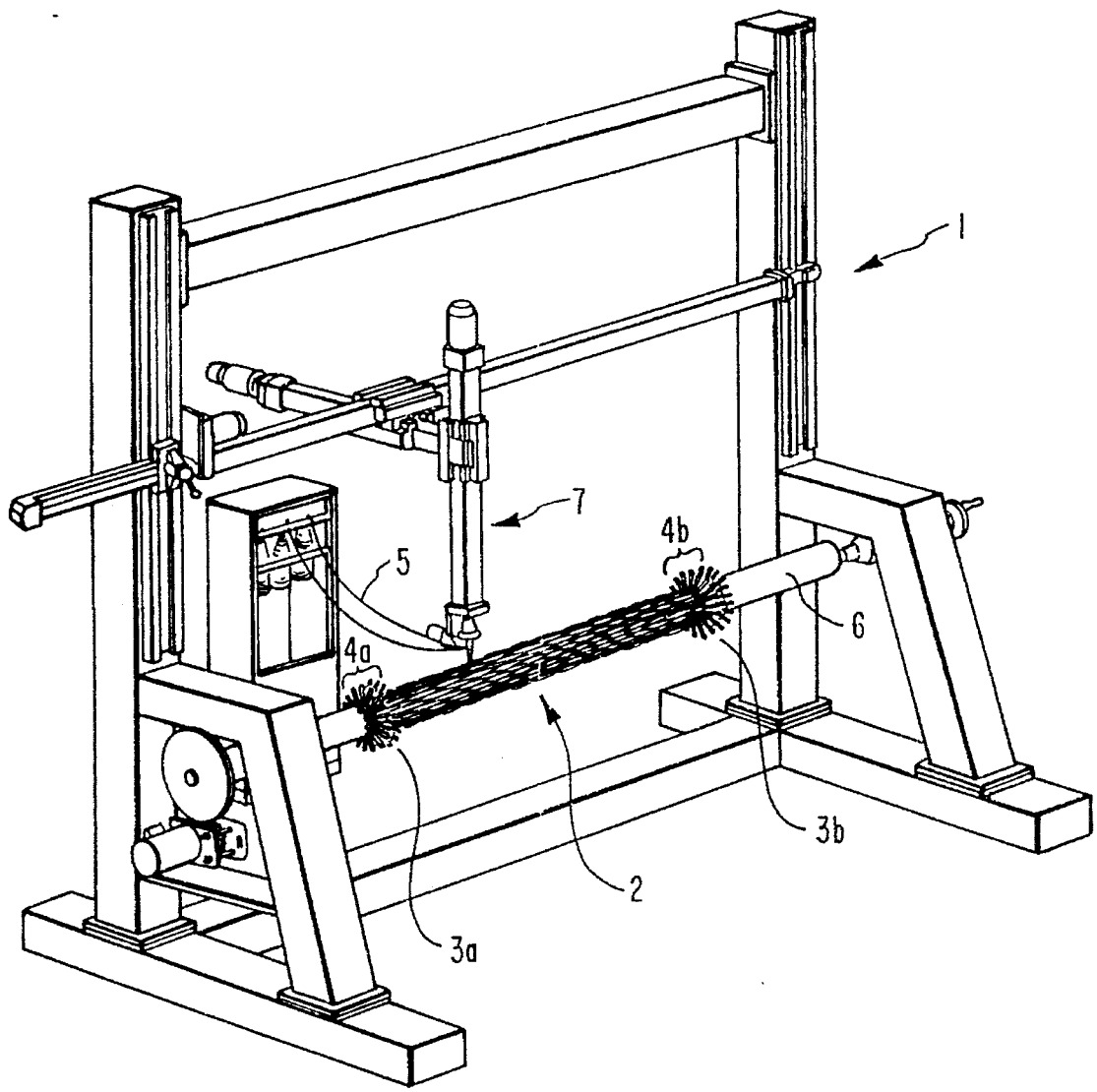
FIG. 1 depicts two of the invented universal pin ring in use on a filament winding machine.

FIG. 1 depicts a filament winding machine 1 in use as it winds a part 2. Continuous fiber 5 is wound in a desired pattern on a mandrel 6 to result in the manufactured part 2. This process is performed by causing the mandrel 2 to rotate about its longitudinal axis at a selected rate while the fiber delivery means 7 wraps fiber 5 around the first pin ring 3a, down the length of the part 2 on the mandrel 6, and around the second pin ring 3b. The delivery means 7 then reverses direction and the process is repeated any number of times. Resin (not shown) is placed on the fiber 5 during the winding process. The pin rings 3a and 3b firmly secure the fiber 5 at the ends of the part 2 and prevent slippage of the fiber 5. Slippage of the fiber 5 can cause defects in or rejection of the manufactured part 2. The turnaround regions 4a and 4b (i.e. the region in which the continuous fiber 5 reverses direction during the winding process) are kept to a minimum size to minimize material waste. This is achieved by the invented universal pin ring that properly guides the fiber 5 so that it quickly conforms to the contour of the mandrel 6 and is anchored in place without slippage. When winding is complete, the wound part 2 is cured and the turnaround regions 4a and 4b are cut off and discarded.

Figure 2:
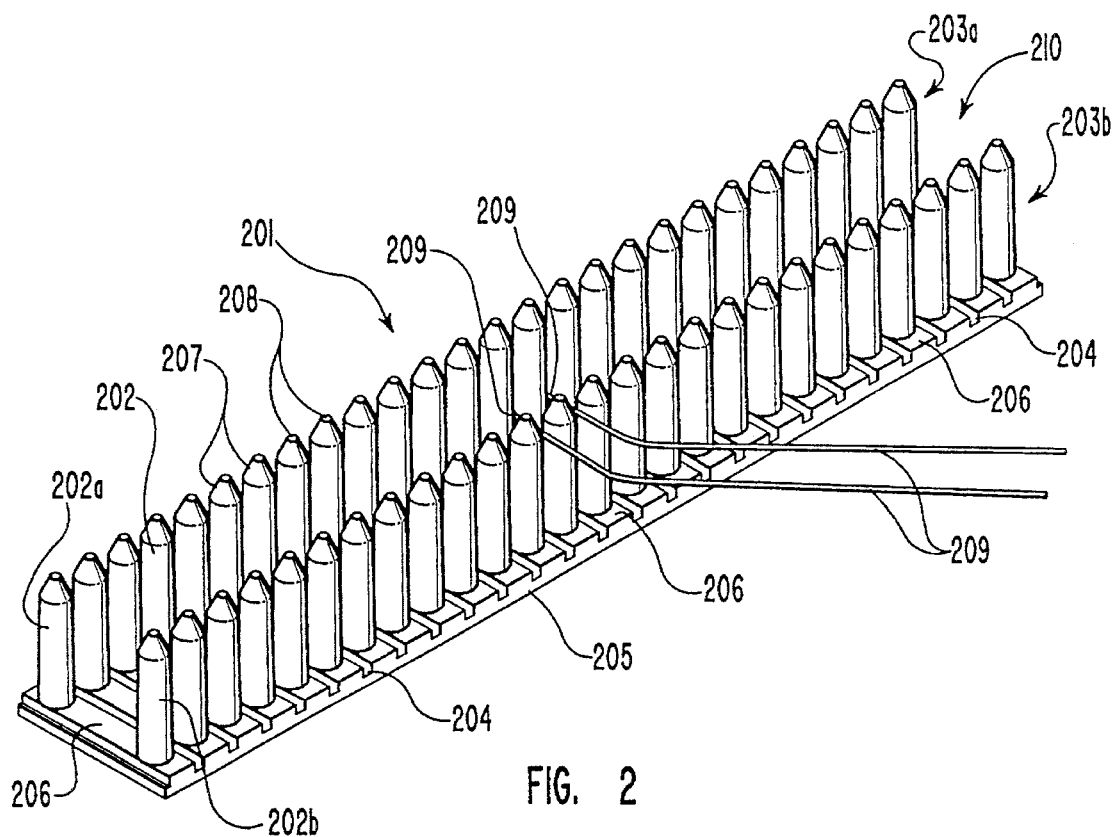
FIG. 2 depicts a perspective view of the invented universal pin ring.

FIG. 2 depicts a perspective view of a preferred embodiment of the invented pin ring 201 before it has been installed onto a mandrel. The pin ring 201 has an elongate backing strip 205 from which a pair of generally parallel rows of pins 203a and 203b protrude. The individual pins 202a and 202b protrude from reinforcing ribs 206 on the proximal side of the pin ring (as compared to the distal side of the pin ring which is the side that contacts the mandrel). The reinforcing ribs 206 provide a strengthened area on the backing strip 205 so that the pins 202a and 202b can withstand lateral forces without collapsing. As can be seen from the figure, the preferred arrangement of the pins 202a and 202b is such that when a line is drawn between corresponding pins 202a and 202b from the two rows 203a and 203b of anchoring pins, such a line will be generally orthogonal to the longitudinal axis of the pin ring. This arrangement of pins into parallel rows and in such corresponding relationship was chosen because it yields a pin ring that both firmly anchors filament as it is being wound and it causes filament to quickly conform to the contour of the mandrel, to minimize the size of the turnaround area. A section of fiber 209 is shown in the figure to illustrate that pins of the distal row of 203a serve as anchor pins 202a, while the pins of the proximal row 203b serve as guide pins 202b. The anchor pins 202a anchor the fiber 209 during winding to prevent fiber slippage. The guide pins 202b guide the fiber 209 so that it quickly conforms to the mandrel contour after turnaround to minimize the turnaround area.

In the preferred embodiment, the invented universal pin ring is 12 inches long and 1.25 inches wide. The preferred pins are round in longitudinal cross section and 3/16 inches in diameter. The preferred top of each pin has an angled or pointed portion 207 that is at a 60 degree angle with the longitudinal axis of the pin. Each preferred pin also has a flat top 208 that is 1/16 inch in diameter. The preferred height of the pins is 0.75 inches. The preferred bottom of each pin has a 1/64 inch radius where the pin joins the backing strip or reinforcing rib. The preferred thickness of the reinforcing ribs is 1/8 inch, and the preferred thickness of the backing strip at the bending and cutting grooves is 1/16 inch. The pins are spaced on the backing strip 1/4 inch apart, and the two parallel rows of anchoring pins are spaced 13/16 inch apart.

In alternative embodiments all of the dimensions of the invented pin ring can be altered. In particular, length, diameter and spacing of both individual pins and rows of pins would be modified for particular applications. For example, if a large component is to be manufactured, then longer, thicker and more widely spaced pins may be desirable to accommodate a greater depth of fiber. In contrast, if small diameter thin-walled components are to be manufactured, then thin closely-spaced pins may be preferred. Other embodiments may provide a pin ring which has three or more rows of pins or with rows of pins that are not lined up in a corresponding relationship as described above. Alternatively, an embodiment of the invented pin ring could have merely a single row of pins. Also, individual pins may be of many configurations, including round, square, triangular, oval, octagonal, tear-drop shaped and otherwise in longitudinal cross section. Further, anchor pins and guide pins may be shaped and sized differently to achieve particular performance characteristics.

In some applications both anchor and guide pins will be used to anchor filament during the winding process. This may be desirable when manufacturing a thick-walled component that requires many layers of filament and resin.

The physical structure of the invented universal pin ring 201 depicted in FIG. 2 is considered advantageous for several reasons. First, it is simple and quick to install on a mandrel by bending the pin ring 201 around the mandrel and then using some fastening means (such as fiber, tape, etc.) wrapped in the anchoring aisle 210 (between the two rows of pins 203a and 203b) to secure the pin ring to a mandrel.

Second, when filament 209 is being wound, the row of anchor pins 203a serves to anchor the filament and prevent slippage while the row of guide pins 203b serves the complementary function of causing the filament 209 to rapidly conform to the contour of the mandrel. This rapid conformation of filament 209 minimizes the turnaround area to reduce material waste and to increase the useful length of the manufactured component. The result is substantial cost savings as compared to prior art pin rings.

Third, the entire structure of the pin ring 201 has a reinforcing effect during winding. As tension is placed on the filament 209 and in turn exerts a lateral force on the anchor pins 202a, the anchor pins 202a would tend to be moved in the direction of the lateral force. The anchor pins 202a, however, are supported by the reinforcing ribs 206 which are oriented generally in the same direction as the lateral force. This orientation allows the anchor pins 202a to use the reinforcing ribs 206 to gain leverage against the mandrel to resist the lateral force and prevent filament 209 slippage. This results in fewer defective parts and consequent cost savings.

Fourth, by providing flex grooves 204 on the proximal side of the backing strip 205 between reinforcing ribs 206, the pin ring 201 may be easily bent around a mandrel. Further, the flex grooves 204 are convenient locations at which to trim the pin ring 201 to the desired length when sizing it to a mandrel.

Fifth, universal pin rings of the structure described are compact to facilitate non-bulky storage in comparison to prior art pin rings.

Sixth, due to the low profile of the invented universal pin ring, the delivery eye of the fiber delivery means 7 can be located closer to the mandrel than was possible when prior art pin rings were used. As a result, fiber tends to lay more smoothly and slip less frequently because it has a reduced angle of departure from the pin ring.

Seventh, when the embodiment of the invented universal pin ring in use has both guide and anchor pins, if there is any slippage of fiber from an anchor pin, then the guide pins serve as a back-up to anchor the slipped fiber. Thus, pin rings with more than one row of pins are preferred because they provide a back-up function.

Eighth, the angled portion at the top of each pin facilitates fiber sliding easily between pins rather than bridging on pins and later slipping.

Figure 3:
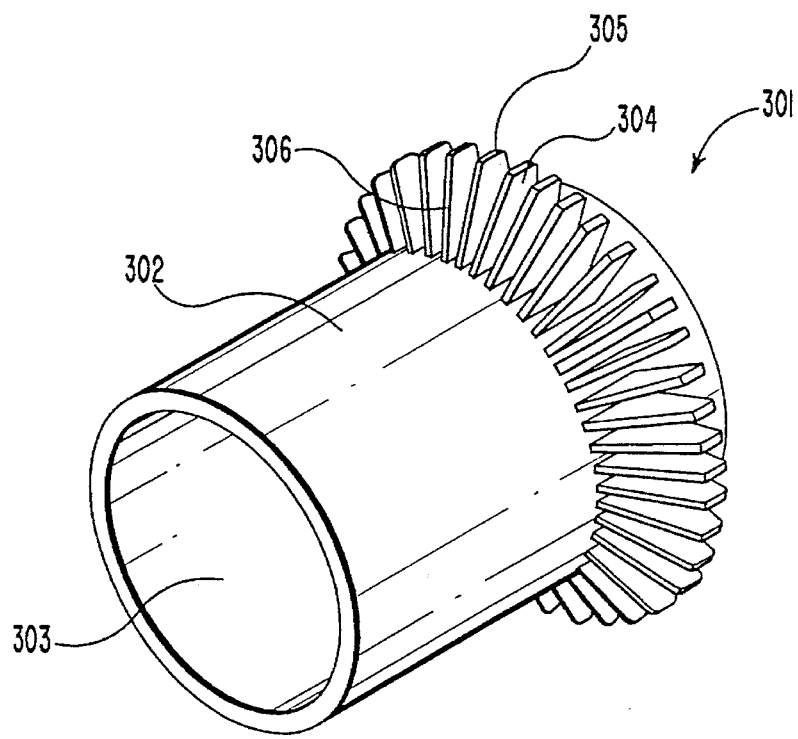
FIG. 3 depicts a perspective view of a prior art pin ring.

FIG. 3 depicts a prior art pin ring 301 of the type used to manufacture down hole tubing for oil drilling. The prior art pin ring 301 consists of a rigid collar section 302 having a hollow interior 303 sized and shaped to fit on a mandrel of a pre-selected diameter. On the exterior of the collar section 302 a plurality of generally triangular-shaped anchor protrusions 304 are found. The anchor protrusions 304 are shaped as thin fins or plates. The anchor protrusions 304 serve as anchor points for filament during the winding process. The rear face 305 of each anchor protrusion 304 anchors the filament, and shape of the front face 306 of the anchor protrusions 304 was chosen by the designers to accommodate the preferred winding pattern for manufacturing down hole tubing.

The prior art pin ring 301 has several disadvantages. First a prior art pin ring must be specifically designed and manufactured for each mandrel size that is desired to be used. This requires a large inventory of prior art pin rings to be kept in stock, or pin rings must be custom made each time a different diameter mandrel is to be used. In contrast, when the invented universal pin ring is used, the universal pin ring can be trimmed, or multiple universal pin rings can be placed end to end, to accommodate any size mandrel.

Second, the anchor protrusions of the prior art pin ring do not always anchor the filament without slippage. Often one or more of the anchor protrusions 304 will fail during winding. The anchor protrusions 304 will often fold against the collar 302 during winding, thereby permitting filament slippage. Alternatively, sometimes filament will bridge and not fall between the prior art anchor protrusions, a problem attributed to their shape. In contrast, the invented pin ring has been found to anchor filament without slippage on parts of a wide variety of sizes and when winding at a variety of angles. This is attributed to the round, pointed shape of the invented anchor pins that causes filament to easily slip between the anchor pins where it may be held firmly.

Third, the prior art pin ring does not cause filament to quickly conform to the mandrel contour, resulting in an excessively long turnaround area and excessive material waste. When the prior art pin ring is used, filament will typically conform to the mandrel contour within about 8–12 inches, resulting in a turnaround area of about 8–12 inches at each end of the manufactured part. After the part is cured, these turnaround areas are cut off and discarded. In contrast, when the invented universal pin ring is used filament typically conforms to the mandrel contour in about 4–6 inches. Because the turnaround area is typically cut off and discarded, this results in a substantial reduction in material waste when compared to the prior art pin ring, although the amount of waste reduction depends to some degree on the wind angle being used.

Fourth, when the prior art pin ring is used, the mandrel must be removed from the winding machine in order to permit the prior art pin ring to be slid onto the mandrel. Alternatively, the prior art pin ring could be cut in half and the two halves then secured to the mandrel. In contrast, when the invented universal pin ring is used, it may simply be wrapped about the mandrel and secured thereto without the necessity of removing the mandrel.

B. Manufacturing the Universal Pin Ring

In the preferred embodiment, the invented universal pin ring is manufactured by the known prior art process of injection molding. The preferred material is polypropylene that is flexible at room temperature to facilitate bending and installation on a round mandrel. Alternatively, the pin ring could be manufactured from other materials, such as nylon if high process temperatures are to be used to prevent melting of the pin ring, or from various forms of polyethylene if a more flexible universal pin ring is desired. A wide range of other thermoplastics may be suitable as well, depending on the exact properties desired. Although injection molding is considered the most practical manufacturing process, it would be possible to extrude, die cut, thermoform of otherwise manufacture the invented pin ring.

C. Method for Using a Pin Ring

In the preferred embodiment, the invented universal pin ring is sized into a pin ring of the size appropriate for the desired mandrel diameter ("sizing the pin ring"). Depending on the diameter of the mandrel to be used, this can be accomplished by trimming the pin ring to a length approximately equal to the circumference of the mandrel. In the preferred embodiment, trimming would occur at the flex grooves 204. Alternatively, sizing the pin ring may be achieved by placing two or more pin rings longitudinally end to end to encompass the diameter of the mandrel to be used, and trimming any excess pin ring length.

Next, the sized pin ring is secured to the mandrel. In the preferred embodiment this is accomplished by rotating the mandrel and winding fibers on the pin ring between the two rows of anchoring pins. Alternatively, plastic ties, tape, strapping tape, wire ties, string, hose clamps, wire or other securing means could be used to secure the pin ring to the mandrel. Typically pin rings will be secured at two positions on a mandrel to permit manufacture of a part between the two positions.

Next, filament is wound between the two sized, secured pin rings, the filament being anchored by and turning around each pin ring and the fiber delivery means passes it. Resin is contacted with the filament during this process, and a wound part results. Anchor pins anchor the filament and guide pins cause the filament to quickly conform to shape of the mandrel being used.

Next, when winding is complete the wound part is removed from the winding machine and cured on the mandrel by known prior art curing techniques. Following curing, the wound part is extracted from the mandrel and the turnaround area is cut from both ends of the wound part.

While the present invention has been described and illustrated in conjunction with a number of specific embodiments, those skilled in the art will appreciate that variations and modifications may be made without departing from the principles of the invention as herein illustrated, described and claimed. The present invention may be embodied in other specific forms without departing from its spirit or essential characteristics. The described embodiments are to be considered in all respects as only illustrative, and not restrictive. The scope of the invention is, thereof, indicated by the appended claims, rather than by the foregoing description. All changes which come within the meaning and range of equivalency of the claims are to be embraced within their scope.

We claim:

1. A pin strip useful for securing filament in a stationary position with respect to a mandrel during a filament winding process, the pin strip comprising:

(a) an elongate backing strip having a proximal side and a distal side, the distal side of said backing strip being adapted to contact a mandrel on which the pin strip may be installed, (b) a plurality of anchor pins arranged on the proximal side of said backing strip, said anchor pins being adapted to secure filament with respect to a mandrel on which the pin strip may be installed, (c) a plurality of guide pins arranged on the proximal side of said backing strip, said guide pins being adapted to cause filament secured by one of said anchor pins to conform to the contour of a mandrel on which the pin strip may be installed, and (d) a plurality of reinforcing ribs on the proximal side of said backing strip, said reinforcing ribs being adapted to reinforce the pin strip against forces placed on it by filament when the pin strip is used to secure filament during a filament winding process;

wherein the pin strip has a longitudinal axis;

wherein the dimensional measurement of the pin strip along said longitudinal axis exceeds the dimensional measurement of the pin strip orthogonal to said longitudinal axis;

wherein said anchor pins are arranged in a first row; and wherein said guide pins are arranged in a second row, said second row being generally parallel to said first row.

2. A pin strip as recited in claim 1 wherein at least one of said reinforcing ribs has an anchor pin located on it, the diameter of said anchor pin, and the positioning of said anchor pin and said reinforcing rib with respect to said backing strip being chosen to cause said anchor pin to resist forces exerted on it by filament during a filament winding process.

3. A pin strip as recited in claim 2 wherein each of said reinforcing ribs has a guide pin located on it.

4. A pin strip as recited in claim 2 further comprising:

(e) a plurality of flex grooves located on the proximal side of said backing strip, said flex grooves being adapted to permit said backing strip to flex to accommodate wrapping the pin strip about a mandrel.

5. A pin strip as recited in claim 4 wherein two adjacent anchor pins each comprise an angled portion at their respective proximal ends, said angled portions being configured to cause filament to readily fall between said two adjacent anchor pins.

6. A pin strip as recited in claim 5 wherein said two adjacent anchor pins each comprise a flat portion at their respective proximal tips.

7. A pin strip as recited in claim 6 wherein said two adjacent anchor pins each comprise a radius at their respective distal ends where they adjoin said backing strip.

8. A universal pin strip useful for securing filament in a stationary position with respect to a mandrel during a filament winding process, the universal pin strip comprising:

(a) an elongate backing strip having a proximal side and a distal side, the distal side of said backing strip being adapted to contact a mandrel on which the pin strip may be installed, (b) a plurality of anchor pins arranged in a first row on the proximal side of said backing strip, said anchor pins being adapted to secure filament with respect to a mandrel on which the pin strip may be installed, (c) a plurality of guide pins arranged in a second row on the proximal side of said backing strip, said guide pins being adapted to cause filament secured by one of said anchor pins to conform to the contour of a mandrel on which the pin strip may be installed and said second row being generally parallel to said first row, (d) an anchoring aisle located on the proximal side of said backing strip between said first row and said second row, said anchoring aisle being adapted to accommodate fastening means useful for securing the pin strip to a mandrel, and (e) a plurality of reinforcing ribs on the proximal side of said backing strip, said reinforcing ribs being adapted to reinforce the pin strip against forces placed on it by filament when the pin strip is used to secure filament during a filament winding process;

wherein the pin strip has a longitudinal axis and wherein the dimensional measurement of the pin strip along said longitudinal axis exceeds the dimensional measurement of the pin strip orthogonal to said longitudinal axis;

wherein said backing strip is configured to permit it to be cut to a desired length to accommodate installation on a mandrel;

wherein at least one of said reinforcing ribs has an anchor pin and a guide pin located on it, the thickness of said anchoring pin, and the positioning of said anchor pin and said reinforcing rib with respect to said backing strip being chosen to cause said anchor pin to resist forces exerted on it by filament during a filament winding process.

9. A universal pin strip as recited in claim 8 further comprising:

(f) a plurality of flex grooves located on the proximal side of said backing strip, said flex grooves being adapted to permit said backing strip to flex to accommodate wrapping the pin strip about a mandrel and said flex grooves being adapted to permit trimming the length of said pin strip to size it to a chosen mandrel.

10. A universal pin strip useful for securing filament in a stationary position with respect to a mandrel during a filament winding process, the universal pin strip comprising:

(a) an elongate backing strip having a proximal side and a distal side, the distal side of said backing strip being adapted to contact a mandrel on which the pin strip may be installed, (b) a plurality of anchor pins arranged in a first row on the proximal side of said backing strip, said anchor pins being adapted to secure filament with respect to a mandrel on which the pin strip may be installed, (c) a plurality of guide pins arranged in a second row on the proximal side of said backing strip, said guide pins being adapted to cause filament secured by one of said anchor pins to conform to the contour of a mandrel on which the pin strip may be installed and said second row being generally parallel to said first row, (d) an anchoring aisle located on the proximal side of said backing strip between said first row and said second row, said anchoring aisle being adapted to accommodate fastening means useful for securing the pin strip to a mandrel, (e) a plurality of reinforcing ribs on the proximal side of said backing strip, said reinforcing ribs being adapted to reinforce the pin strip against forces placed on it by filament when the pin strip is used to secure filament during a filament winding process, and (f) a plurality of flex grooves located on the proximal side of said backing strip, said flex grooves being adapted to permit said backing strip to flex to accommodate wrapping the pin strip about a mandrel and said flex grooves being adapted to permit trimming the length of said pin strip to size it to a chosen mandrel;

wherein the pin strip has a longitudinal axis and wherein the dimensional measurement of the pin strip along said longitudinal axis exceeds the dimensional measurement of the pin strip orthogonal to said longitudinal axis;

wherein said backing strip is configured to permit it to be cut to a desired length to accommodate installation on a mandrel; and wherein at least one of said reinforcing ribs has an anchor pin and a guide pin located on it, the thickness of said anchoring pin, and the positioning of said anchor pin and said reinforcing rib with respect to said backing strip being chosen to cause said anchor pin to resist forces exerted on it by filament during a filament winding process.

11. A universal pin strip as recited in claim 10 further comprising:

(h) a plurality of flex grooves located on the proximal side of said backing strip, said flex grooves being adapted to permit said backing strip to flex to accommodate wrapping the pin strip about a mandrel and said flex grooves being adapted to permit trimming the length of said pin strip to size it to a chosen mandrel.

12. A universal pin strip useful for securing filament in a stationary position with respect to a mandrel during a filament winding process, the universal pin strip comprising:

(a) an elongate backing strip having a longitudinal axis, a first end, a second end, a proximal side, and a distal side, the distal side of said backing strip being adapted to contact a mandrel on which the pin strip may be installed, (b) a pin row comprising a plurality of protruding pins, said pin row being located on the proximal side of said backing strip, said pin row being generally parallel to said longitudinal axis, (c) an anchoring aisle located on the proximal side of said backing strip adjacent to said pin row, said anchoring area being adapted to accommodate fastening means useful for securing the pin strip to a mandrel, and (d) a plurality of reinforcing ribs on the proximal side of said backing strip, said reinforcing ribs being adapted to reinforce the pin ring against forces placed on it by filament when the pin strip is used to secure filament during a filament winding process;

wherein at least one of said pins is generally circular in a cross section taken orthogonal to the longitudinal axis of said pin;

wherein at least one of said pins comprises an angled portion at its proximal end, said angled portion being adapted to facilitate placement of filament beside said pin;

wherein at least one of said pins is configured to serve as an anchor pin to anchor filament during a filament winding process; and wherein a number of said reinforcing ribs has an anchor pin located on it, the positioning of said anchor pin and said reinforcing rib with respect to said backing strip being chosen to cause said anchor pin to resist forces exerted on it by filament during a filament winding process.

13. A universal pin strip as recited in claim 12 further comprising:

(e) a plurality of flex grooves located on the proximal side of said backing strip, said flex grooves being adapted to permit said backing strip to flex to accommodate wrapping the pin strip about a mandrel.

14. A pin strip comprising:

(a) a backing strip, the backing strip having a proximal side and a distal side, the distal side of said backing strip being adapted to contact a mandrel on which the pin strip may be installed, (b) a plurality of pins located on the proximal side of said backing strip, said pins being of sufficient size and strength that they are adapted to secure filament under tension with respect to a mandrel on which the pin strip may be installed during low angle helical winding, and (c) a plurality of spaces existing between said pins;

wherein the pin strip is installable on mandrel to secure filament in the filament turnaround region of the mandrel during low angle helical winding of a filament winding process;

wherein the pin strip may be installed circumferentially about the exterior surface of one end of a cylindrical mandrel to form a pin ring on the mandrel such that the plane in which the circumference of the pin ring lies is substantially orthogonal to the longitudinal axis of the mandrel;

wherein said pins are arranged into at least two rows on said backing strip, said rows being generally parallel to each other and said rows being equidistant from the longitudinal center of the mandrel;

wherein said pins are adapted to cause filament being wound using the pin strip to be held securely in said spaces existing between said pins;

wherein at least some of said spaces are adapted to accomodate a means for fastening the pin strip to a mandrel for use in filament winding; and wherein the pin strip is a component having pins and a backing strip which have been injection molded from thermoplastic.

15. A pin strip as recited in claim 14 further comprising:

(d) a plurality of reinforcing ribs on the proximal side of said backing strip, said reinforcing ribs being adapted to reinforce the pin strip against forces placed on it by filament when the pin strip is used to secure filament during a filament winding process.

16. A pin strip as recited in claim 14 further comprising:

(d) a plurality of flex grooves located on the proximal side of said backing strip, said flex grooves being adapted to permit said backing strip to flex to accommodate installing the pin strip on the exterior of a mandrel in the form of a pin ring.

17. A universal pin strip useful for securing filament in a stationary position with respect to a mandrel during a filament winding process, the universal pin strip comprising:

(a) an elongate backing strip having a longitudinal axis, a proximal side and a distal side, the distal side of said backing strip being adapted to contact a mandrel on which the pin strip may be installed, (b) a first row comprising a plurality of protruding pins, said first row being located on the proximal side of said backing strip, said first row being generally parallel to said longitudinal axis, (c) a second row comprising a plurality of protruding pins, said first row being located on the proximal side of said backing strip, said second row being generally parallel to said first row, (d) an anchoring aisle located on the proximal side of said backing strip between said first row and said second row, said anchoring aisle being adapted to accommodate fastening means useful for securing the pin strip to a mandrel to form a ring, and (e) a plurality of reinforcing ribs on the proximal side of said backing strip, said reinforcing ribs being adapted to reinforce the pin strip against forces placed on it by filament when the pin strip is used to secure filament during a filament winding process;

wherein at least one of said reinforcing ribs has a pin located on it, the positioning of said pin and said reinforcing rib with respect to said backing strip being chosen to cause said pin to resist forces exerted on it by filament during a filament winding process;

wherein the dimensional measurement of the pin strip along said longitudinal axis exceeds the dimensional measurement of the pin strip orthogonal to said longitudinal axis; and wherein the pin strip is installed at one end of a mandrel as a ring by having its longitudinal dimension bent around the circumference of the mandrel to form said ring, and having filament wrapped about the circumference of said pin ring to cause it to be firmly held against the mandrel.

18. A pin strip as recited in claim 17 further comprising:

(f) a plurality of flex grooves located on the proximal side of said backing strip, said flex grooves being adapted to permit said backing strip to flex to accommodate wrapping the pin strip about a mandrel to form a pin ring, and said flex grooves being adapted to permit trimming the length of said pin strip to size it to a chosen mandrel;

wherein the pin strip is a component having pins and a backing ring which have been injection molded from thermoplastic.

* * * * *

UNITED STATES PATENT AND TRADEMARK OFFICE
CERTIFICATE OF CORRECTION

PATENT : 5,468,329

DATED : Nov. 21, 1995

INVENTOR(S) : Philpot et al.

It is certified that error appears in the above-identified patent and that said Letters Patent is hereby corrected as shown below:

On the title page, insert item [75], as listed below:

```
Daniel K. Buckmiller
Sandra C. Ventrello
Randall J. Philpot
Douglas G. Olsen
Eric R. Welsh
```

Signed and Sealed this

Thirtieth Day of December, 1997

*Attest:*

BRUCE LEHMAN

*Attesting Officer*   *Commissioner of Patents and Trademarks*